United States Patent [19]

Svoboda

[11] 4,293,659

[45] Oct. 6, 1981

[54] COMPOSITION FOR COATING MOLDED ARTICLES

[75] Inventor: Glenn R. Svoboda, Grafton, Wis.

[73] Assignee: Freeman Chemical Corporation, Port Washington, Wis.

[21] Appl. No.: 145,799

[22] Filed: May 1, 1980

[51] Int. Cl.$^3$ .................. C08G 18/04; C08G 18/42; C08G 18/80

[52] U.S. Cl. .................. 525/28; 260/40 TN; 264/255; 525/31; 525/528; 525/922

[58] Field of Search .................. 525/28, 31, 528, 922; 260/40 TN

[56] References Cited

U.S. PATENT DOCUMENTS

| | | | |
|---|---|---|---|
| 3,478,126 | 11/1969 | Turpin | 525/28 |
| 3,644,569 | 2/1972 | Pietsch et al. | 525/28 |
| 3,849,160 | 11/1974 | Dhein et al. | 427/375 |
| 3,966,681 | 6/1976 | Maeda et al. | 525/922 |
| 4,081,578 | 3/1978 | Van Essen et al. | 264/255 |
| 4,169,825 | 10/1979 | Yapp et al. | 525/438 |
| 4,246,380 | 1/1981 | Gras et al. | 525/528 |

*Primary Examiner*—James H. Derrington

[57] ABSTRACT

A method for producing coated, molded, fiber-reinforced thermoset plastic articles having an adherent coating in heated matched metal molds.

The coating composition includes (A) a blocked polyisocyanate which is the reaction product, essentially free of unreacted —NCO radicals, of e-caprolactam and organic polyisocyanate;

(B) a polyepoxide-polyacrylate which is the reaction product, essentially free of unreacted epoxy radicals of a polyepoxide and acrylic or methacrylic acid;

(C) ethylenically unsaturated polyester resin;

(D) copolymerizable alpha-beta ethylenically unsaturated monomer;

(E) an initiator for addition polymerization;

(F) a catalyst for the reaction of —NCO radicals and —OH radicals;

(G) filters, such as inert particulate filled, pigments, mold release agents.

The coating composition is applied in the matched metal mold after a fiber-reinforced thermoset plastic article has been shaped within the mold. The coating composition is applied by opening the mold and introducing the described coating composition, thereafter closing the mold and retaining the mold in the closed condition until the plastic article is further cured and the described coating composition is cured.

1 Claim, No Drawings

COMPOSITION FOR COATING MOLDED ARTICLES

BACKGROUND OF THE INVENTION

1. Field of the Invention

The invention relates to thermoset fiber-reinforced molded articles having in-mold applied coatings.

2. Description of the Prior Art

MATCHED METAL MOLDING—Fiber-reinforced, thermosetting resinous products are produced in elevated temperature, matched metal molds. One of the shortcomings of this process is that the molded article surface tends to be irregular and tends to have surface exposure of the reinforcing fibers, usually glass fibers.

IN-MOLD COATINGS—The in-mold coating technique has been developed to improve the quality of the surface of a molded article after the curing of the article in a matched metal mold has been substantially advanced, U.S. Pat. No. 4,081,578. In the matched metal molding process, two or more shaped mold elements cooperate to define a mold cavity. A molding composition (polymerizable thermosetting resin and fibrous reinforcing material and usually fillers, catalysts, mold release agents, and other reagents) is introduced into a mold cavity between the matched metal mold surfaces. The shaped mold elements are brought together to spread the molding composition throughout the mold cavity and to confine the molding composition until curing is essentially completed. The heated mold elements initiate polymerization. When the polymerization is well advanced, i.e., the article has assumed the shape of the mold cavity, the mold surfaces are separated slightly, usually a distance from 3 to 40 mils, and a liquid, in-mold, coating composition is injected under pressure into the mold cavity. Thereafter the mold elements are again brought together under pressure which causes the liquid coating composition to disperse over the surface of the partially cured article and to conform with the surface of the contiguous mold element. After a suitable time, the polymerization of the article is essentially completed and the polymerization of the coating composition is essentially completed. At that time the mold elements are separated and the coated, molded article is removed.

Two-component in-mold coating compositions are known, U.S. Pat. No. 4,081,578, which employ polyisocyanates as one ingredient and employ hydroxy-terminated high molecular weight unsaturated polyester resin as another ingredient. These compositions have limited pot life after being mixed and must be used promptly. These compositions have exhibited some inadequate adhesive properties.

There is a demonstrated need for a single-component coating composition which can be prepared and retained for extended periods of time by the molding operator.

SUMMARY OF THE INVENTION

According to the present invention, an in-mold coating composition is provided for thermoset fiber-reinforced plastic molded articles. The composition includes (A) a blocked polyisocyanate which is the reaction product, essentially free of unreacted —NCO radicals, of e-caprolactam and organic polyisocyanate;

(B) a polyepoxide-polyacrylate which is the reaction product, essentially free of unreacted epoxy radicals of a polyepoxide and acrylic or methacrylic acid;

(C) ethylenically unsaturated polyester resin;

(D) copolymerizable alpha-beta ethylenically unsaturated monomer;

(E) an initiator for addition polymerization;

(F) a catalyst for the reaction of —NCO radicals and OH radicals;

(G) fillers, such as inert particulate fillers, pigments, mold release agents.

The composition is employed as a single component inmold coating for fiber-reinforced plastic articles in the manner known in the art.

DESCRIPTION OF THE PREFERRED EMBODIMENT (S)

Each of the ingredients in the present coating composition will be described to enable those skilled in the art to assemble a useful coating composition in accordance with the present teachings.

A. The Blocked Polyisocyanate

Blocked polyisocyanates are well-known in the urethane coatings art. e-caprolactam has been employed as a blocking agent for polyisocyanates. The blocked polyisocyanate is prepared by combining a selected polyisocyanate with a stoichiometric equivalent of the e-caprolactam. Preferred polyisocyanates are those having —NCO ratios from about 2.2 to about 3.2 and an equivalent weight per —NCO radical of 100–300. A preferred polyisocyanate is polymethylene polyphenyl polyisocyanate which is commercially available under a variety of trade names such as PAPI and which has an —NCO equivalent of 2.5–2.8 and an equivalent weight per —NCO radical of 131–135. The blocked isocyanate obtained by reacting e-caprolactam with polymethylene polyphenyl polyisocyanate will unblock at a temperature of about 300° F. The unblocking temperature is important in in-mold coatings inasmuch as the coating composition depends for its performance upon the unblocking of the blocked polyisocyanate at an existing temperature within the molding cavity.

Upon unblocking, the blocked polyisocyanate yields a polyisocyanate fragment and an e-caprolactam fragment. The polyisocyanate fragment reacts with pendant hydroxyl radicals which are presented in the polyepoxide polyacrylate and in the unsaturated polyester resin. The e-caprolactam fragment remains in the article, i.e., it does not volatilize at the molding temperature.

A preferred blocked polyurethane is prepared by combining 46.67 grams e-caprolactam with 53.33 grams polymethylene polyphenyl isocyanate having an —NCO equivalent weight of 131–135. The ingredients are held at about 300°–320° F. for about 30 minutes until the —NCO content of the product is less than about 0.5 weight percent. For convenience the product is combined with an equal weight of monomeric styrene to prepare a solution for convenient mixing.

In addition to the polymethylene polyphenyl polyisocyanate, other particularly desirable polyisocyanates for use as starting materials include isophorone diisocyanate; low (less than 1200) molecular weight adducts of polyols or polyesters with polyisocyanates.

B. Polyepoxide-Polyacrylate

A polyepoxide-polyacrylate is prepared by combining a polyepoxide with a stoichiometric equivalent of acrylic or methacrylic acid as described in U.S. Pat. Nos. 3,373,075; 3,301,743. Typical polyepoxides include the diglycidyl ether of bisphenol-A; polyepoxides of phenol formaldehyde condensation products; aliphatic polyepoxides; the reaction products of polyepoxides with dicarboxylic or polycarboxylic acids such as the reaction product of the diglycidyl ether of bisphenol-A with dimer acid as described in U.S. Pat. No. 3,256,226. One characteristic of the polyepoxide-polyacrylate materials is the pendant secondary hydroxyl radicals which result from the condensation of an epoxy radical with the carboxylic group of the acrylic or methacrylic acid. These pendant secondary hydroxyl radicals combine during the present coating composition with the —NCO radicals which are available following unblocking of the blocked polyisocyanate.

C. Ethylenically Unsaturated Polyester Resin

The ethylenically unsaturated polyester resin can be any resin which is prepared by the polyesterification of a polyol with a polycarboxylic acid, at least a portion of which contains ethylenic unsaturation. Typical useful unsaturated polyester resins contain as the polyol any of the low molecular weight glycols such as ethylene glycol, propylene glycol, diethylene glycol, dipropylene glycol, polyethylene glycol, polypropylene glycol, butylene glycol, neopentyl glycol and the like; and contain maleic acid, maleic anhydride or fumaric acid or possibly other unsaturated dicarboxylic acids such as itaconic acid, citraconic acid; and may contain quantities of other dicarboxylic acids or polycarboxylic acids which do not contain ethylenic unsaturation such as phthalic acid, phthalic anhydride, isophthalic acid, terephthalic acid, adipic acid, azelaic acid, and the like. Polyesters also may be modified by the addition of cyclopentadiene or dicyclopentadiene, for example.

D. The Copolymerizable Monomer

Copolymerizable monomers include styrene, alpha methyl styrene, divinyl benzene, vinyl toluene, acrylate or methacrylate esters such as ethyl acrylate, methyl acrylate, propyl acrylate, butyl acrylate, hexyl acrylate and the corresponding methacrylates; ethylene glycol diacrylate, ethylene glycol dimethacrylate, acrylic and methacrylic esters of diepoxides such as the acrylic or methacrylic diester of the diglycidyl ether of bisphenol-A.

E. Initiator for Addition Polymerizations

Preferably the addition polymerization initiator is a high temperature initiator such as tertiary benzyl perbenzoate, dicumyl peroxide. The amount of initiator in the composition is 0.2 to 2.5 weight percent based on resinous ingredients.

F. Catalyst for Reaction of —NCO Radicals and —OH Radicals

Typical catalysts are tin catalyst or amine catalysts which are well-known in the polyurethane coatings art, for example, dibutyl tin dilaurate; stannous octoate. The amount of catalyst included in the composition is 0.2 to 2.0 weight percent based on the weight of the blocked polyisocyanate.

G. Fillers

The present coating composition requires no fillers for its performance. However, typical fillers for extending and opacifying purposes might include powdered calcium carbonate; powdered mica; powdered silica; powdered glass; other inert inorganic fillers. A mold release agent may be included as an inert filler such as zinc stearate or calcium stearate. With appropriate pigmented fillers, the present coating composition can produce an attractive colored surface on the resulting molded article, thereby avoiding any need for subsequent surface painting.

Proportions

The unsaturated polyester resin and copolymerizable monomer comprise the principal ingredient of the resin system, i.e., constitute more than 50 weight percent of the resin system.

A balance is established between the quantity of blocked polyisocyanate and the hydroxyl groups supplied by the unsaturated polyester and the polyepoxide polyacrylate such that the NCO/OH ratio is 0.2 to 0.8. The blocked polyisocyanate and the polyepoxide polyacrylate comprise from 10 to 49 weight percent of the resin system.

Preparation

The ingredients in the present composition can be combined in any sequence. The resulting coating composition is a liquid having a viscosity of about 1,000–50,000 centipoises. Unfilled compositions will have viscosities in the lower portion of the viscosity range.

Glass Fiber-Reinforced Thermoset Molded Articles

The molded articles customarily are fabricated from unsaturated polyester resin compositions which include A. an unsaturated polyester resin usually formed by polyesterification of organic polyols and organic polycarboxylic acids, at least a portion of which includes ethylenically unsaturated polycarboxylic acid;

B. copolymerizable monomer for the unsaturated polyester resin, usually styrene;

C. fillers, including particulate inert fillers, catalysts for the condensation polymerization of the unsaturated polyester resin with the copolymerizable monomer;

D. mold release agents;

E. glass fiber reinforcing materials.

The molding composition is introduced into a matched metal mold at temperatures usually in the range of 300° F. The mold is closed and the molding composition is allowed to polymerize and assume the shape of the interior of the mold.

In-Mold Coatings

After the molded article has at least partially polymerized and assumed the shape of the interior of the mold, the mold is opened and an in-mold coating composition is introduced. Thereafter the mold is closed once more causing the coating composition to spread over at least one surface of the molded article. The mold is retained in a closed position for a sufficient period to allow the molded article to complete further curing and to allow the coating composition to be cured as an adherent coating over at least one surface of the molded article. Thereafter the mold is opened and the thermoset glass fiber-reinforced plastic molded article is recovered having a cured, adherent coating of the present coating composition over at least one surface thereof.

EXAMPLES

Example 1

A coating composition was prepared by combining the following ingredients:
A. Blocked polyisocyanate—reaction product of e-caprolactam with polymethylene polyphenyl polyisocyanate having —NCO equivalent weight 131-135;
B. Polyepoxide polyacrylate obtained by reacting one mol of the diglycidyl ether of bisphenol-A with two mols methacrylic acid;
C. Ethylenically unsaturated polyester resin obtained by polyesterification of phthalic anhydride, maleic anhydride, diethylene glycol, dicyclopentadiene; (acid value 3.0);
D. Monomeric styrene;
E. Initiator—tertiary butyl perbenzoate;
F. Catalyst—dibutyl tin dilaurate;
G. Fillers—zinc stearate; powdered calcium carbonate;
H. Inhibitor—toluhydroquinone and monotertiary butyl hydroquinone.

The ingredients were combined in the following proportions:
A—6.65 parts by weight of the blocked polyisocyanate;
B—19.27 parts by weight;
C—45.87 parts by weight;
D—21.47 parts by weight;
E—0.73 parts by weight;
F—0.09 parts by weight;
G zinc stearate—2 parts by weight; powdered calcium carbonate—138 parts by weight;
Pigment—2.3 parts by weight;
Inhibitors
Toluhydroquinone—100 parts per million;
Monotertiary butyl hydroquinone—200 parts per million.

All of the ingredients were combined to produce a liquid coating composition having a viscosity of about 20,00 centipoises.

Example 2

The composition of Example 1 was employed to produce an in-mold coated article in a mold comprising 14"×14" flat sheet of glass fiber reinforced polyester, ⅛" thick. The coating composition was introduced into the open mold in a sufficient quantity to provide a coating 3 mils thick. The mold was closed and maintained at 325° F. for 3 minutes. The resulting article had excellent adhesion and exhibited no cracks when flexed. The molded article had a good surface appearance, i.e., was essentially free of bubbles and pockets.

I claim:
1. A storage stable composition for the in-mold coating of a molded, fiber-reinforced thermoset plastic article comprising a resin system including
   (A) a blocked polyisocyanate which is the reaction product, essentially free of unreacted -NCO radicals, of e-caprolactam and organic polyisocyanate;
   (B) a polyepoxide-polyacrylate which is the reaction product, essentially free of unreacted epoxy radicals of a polyepoxide and acrylic or methacrylic acid;
   (C) ethylenically unsaturated polyester resin;
   (D) copolymerizable alpha-beta ethylenically unsaturated monomer;
wherein the said ethylenically unsaturated polyester resin and the said copolymerizable alpha-beta ethylenically unsaturated monomer comprise more than 50 weight percent of the said resin system and the said blocked isocyanate is present in sufficient quantity that the ratio of NCO/OH radicals in the resin system after unblocking of the said blocked polyisocyanate is from 0.2 to 0.8;
   said composition also including an initiator for addition polymerization; a catalyst for the reaction of —NCO radicals and —OH radicals; and fillers.

* * * * *